United States Patent [19]

Cripe et al.

[11] 4,276,968
[45] Jul. 7, 1981

[54] RAIL CAR BRAKE SYSTEM

[75] Inventors: Alan R. Cripe; Christopher A. Cripe, both of Richmond, Va.

[73] Assignee: Bi-Modal Corporation, Greenwich, Conn.

[21] Appl. No.: 894,731

[22] Filed: Apr. 10, 1978

[51] Int. Cl.³ .......................... B60T 1/04; F16D 65/52
[52] U.S. Cl. ................................. 188/153 R; 188/74; 188/72.8; 188/198; 308/72; 308/219; 308/234
[58] Field of Search ............ 188/57, 74, 72.8, 79.5 K, 188/361, 153 R, 153 D, 197, 198, 202, 203; 308/72, 219, 234

[56] References Cited

U.S. PATENT DOCUMENTS

| | | | |
|---|---|---|---|
| 1,832,649 | 11/1931 | Orelind | 308/72 |
| 2,561,454 | 7/1951 | Williams | 188/79.5 K |
| 2,995,406 | 8/1961 | Pitner | 308/234 |
| 3,093,214 | 6/1963 | Polanin | 188/153 R |
| 3,557,915 | 1/1971 | Pollinger | 188/153 R |
| 3,926,094 | 12/1975 | Kurichh et al. | 308/72 |
| 3,949,840 | 4/1976 | Cumming et al. | 188/79.5 K |
| 4,022,300 | 5/1977 | Afanador et al. | 188/72.8 |
| 4,036,330 | 7/1977 | Henning et al. | 188/22.8 |
| 4,132,452 | 1/1979 | Riegler et al. | 308/72 |

FOREIGN PATENT DOCUMENTS

| | | | |
|---|---|---|---|
| 6806358 | 11/1968 | Netherlands | 188/79.5 K |
| 231715 | 4/1925 | United Kingdom | 308/72 |

Primary Examiner—Edward R. Kazenske
Attorney, Agent, or Firm—Max R. Millman

[57] ABSTRACT

A rail car brake system of high mechanical efficiency which is compact, light in weight and economical in that it utilizes mass produced highway truck brake cylinders and slack adjusters and is easy to maintain. Critical components are lubricated and fully sealed against foreign particles. The brake system includes a shoe which is mounted in a brake head to operate in a direction truly perpendicular to the wheel tread to reduce wear, employs a long-lead screw operatively inter-connecting the brake cylinder and brake head via an automatic slack adjuster and an anti-friction roller bearing supporting the screw whereby direct load path absorption of the brake application forces is effected. The brake system also includes a parking brake which is automatically applied and released and which also provides emergency braking capability should the service brake fail. Each brake system operates on one wheel.

6 Claims, 7 Drawing Figures

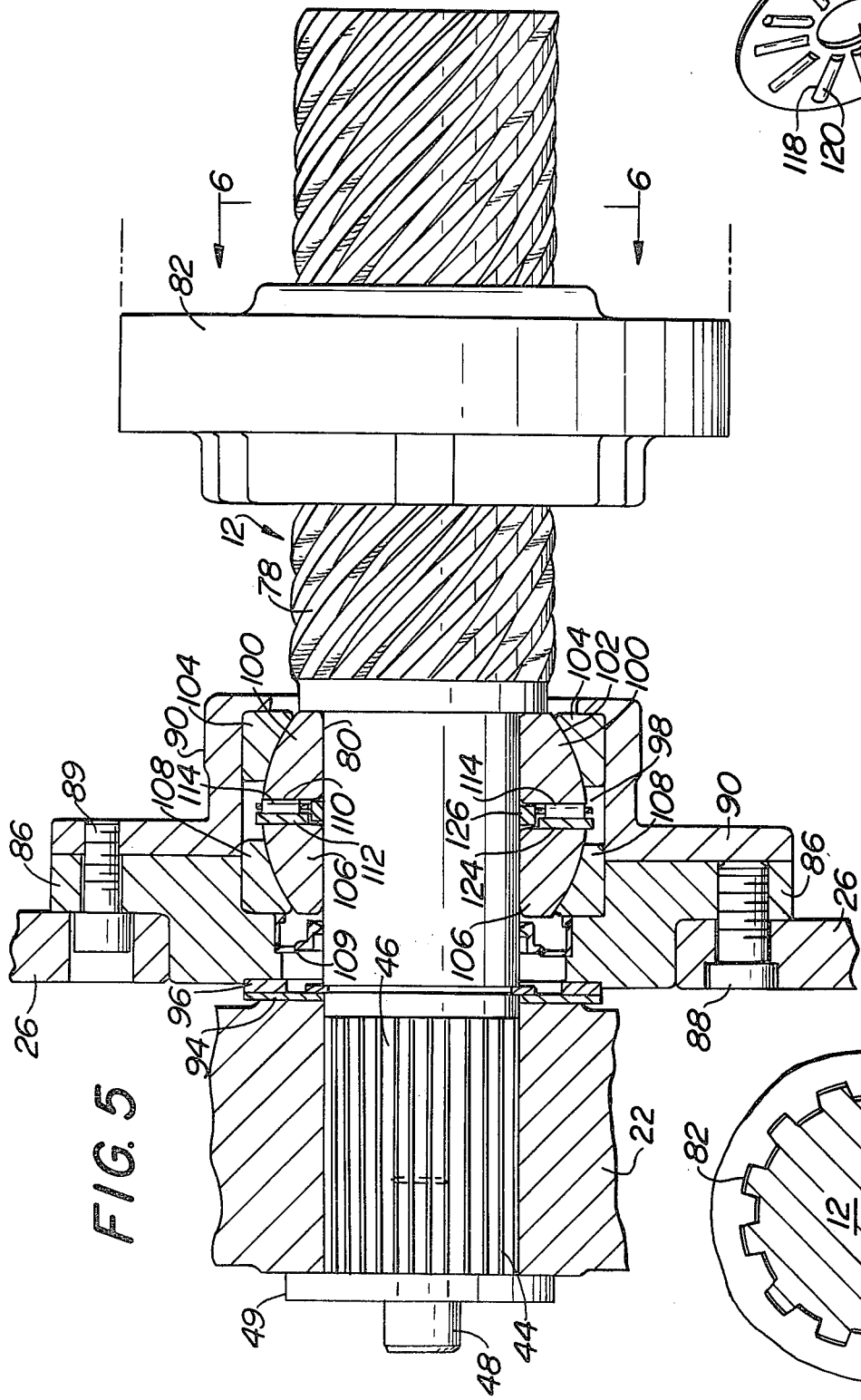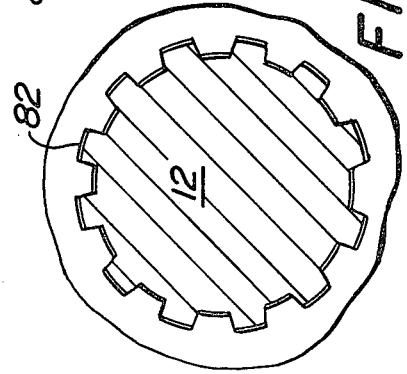

RAIL CAR BRAKE SYSTEM

This invention relates to a brake system for railroad cars, locomotives, transit cars, wheeled vehicles and the like.

Conventional railroad car brake systems possess many disadvantages. They include a multiplicity of heavy, cumbersome, crude metal parts. For freight cars, one large heavy cylinder is generally mounted approximately at the center of the car and operates the brakes on all the wheels via one slack adjuster, then approximately thirty-foot long rods on each side of the cylinder, then through extensive rigging to the brake beams which mount the brake shoes, which beams are slidably mounted on the truck frames to force brake shoes against wheels. Because the parts are largely unmachined, high frictional forces are developed which considerably reduce the brake system efficiency. A lever system is used to mechanically equalize the brake forces on the wheels, but the high frictional forces inherent in the system severely restrict the amount of equalization obtained.

Additionally, because each car uses only one cylinder and one slack adjuster in conjunction with a lever system to equalize the brake forces, failure of one element results in a total failure of the brake system for that car. Furthermore, the heavy parts mounted on the trucks are subject to high acceleration forces with consequent wear and possible failure. It is well known in railroad operation that broken beams are a common cause of derailments.

Moreover, because of the high wear characteristics of the brake shoe and wheel, long travel of the brake shoe is required. This plus the extensive rigging and lever system and the high deflections and resultant lost motion make it necessary for a very long stroke to be produced at the brake cylinder. This results in time loss and slow brake application time which, at high speeds, is undesirable and results in longer stopping distances.

Also, the hand brake assembly of conventional railroad brakes for parking or grade holding also possesses disadvantages. The conventional hand brake is manually operated to apply the brakes and is held by a ratchet. This arrangement is time consuming in that it requires a man to go from car to car to apply the brakes, sometimes with insufficient force and inadequate braking for safe parking. Additionally, since it is frequently possible to incompletely release the brakes, or not to release the brakes on one car at all, the result is dragging brakes which overheat the wheels and damage them. Such thermally damaged wheels can come loose on the axle, crack or break and are known to have caused major accidents.

The primary object of this invention is to provide a unitized rail car brake system for each wheel which overcomes the aforementioned disadvantages of the conventional rail car braking systems and utilizes several mass produced, space saving, highway truck components, thereby reducing the cost of the braking system.

Another object of this invention is to provide a brake system in which the components by virtue of their light weight reduce acceleration forces thereon, particularly at high speed, thereby minimizing failures and reducing the overall weight of the brake system.

Another object of the invention is to provide a rail car brake system possessing high mechanical efficiency by virtue, among other things, of the use of an automatic slack adjuster making possible short brake shoe travel, and minimizing lost motion in the system.

Another object of the invention is to provide a rail car brake system in which high mechanical efficiency is obtained by pivotally mounting the brake head on a brake hanger, providing a novel screw operatively interconnecting the brake cylinder piston and brake head and employing an anti-friction roller bearing support for the screw so that direct load path absorption of the brake application forces is effected.

Another object of the invention is to provide a rail car brake system in which the shoe is mounted to operate in a direction truly perpendicular to the wheel tread, thereby minimizing wear on the shoe and wheel.

Another object of the invention is to provide a compact, light weight, economical rail car brake system in which the brake cylinder is easily removable and the critical components are fully sealed, thereby reducing maintenance and facilitating repair of the brake system.

Another object of the invention is to provide a rail car brake system which employs a light weight cylinder, slack adjuster and means to apply braking force for each wheel so that failure of one element will not cause failure of the entire brake system of the car.

A further object of the invention is to provide a rail car brake system which includes a parking brake for each wheel that is automatically applied and released and which provides emergency braking capability should the service brake fail.

These and other objects and features of the invention will become more apparent as the following description proceeds in conjunction with the accompanying drawings, wherein:

FIG. 5 is a sectional view taken on the line 5—5 of FIG. 2;

FIG. 6 is a sectional view taken on the line 6—6 of FIG. 5; and

FIG. 7 is a perspective view of a needle bearing employed in the invention.

Specific reference is now made to the drawings in which similar reference characters are used for corresponding elements throughout.

Figure 1:
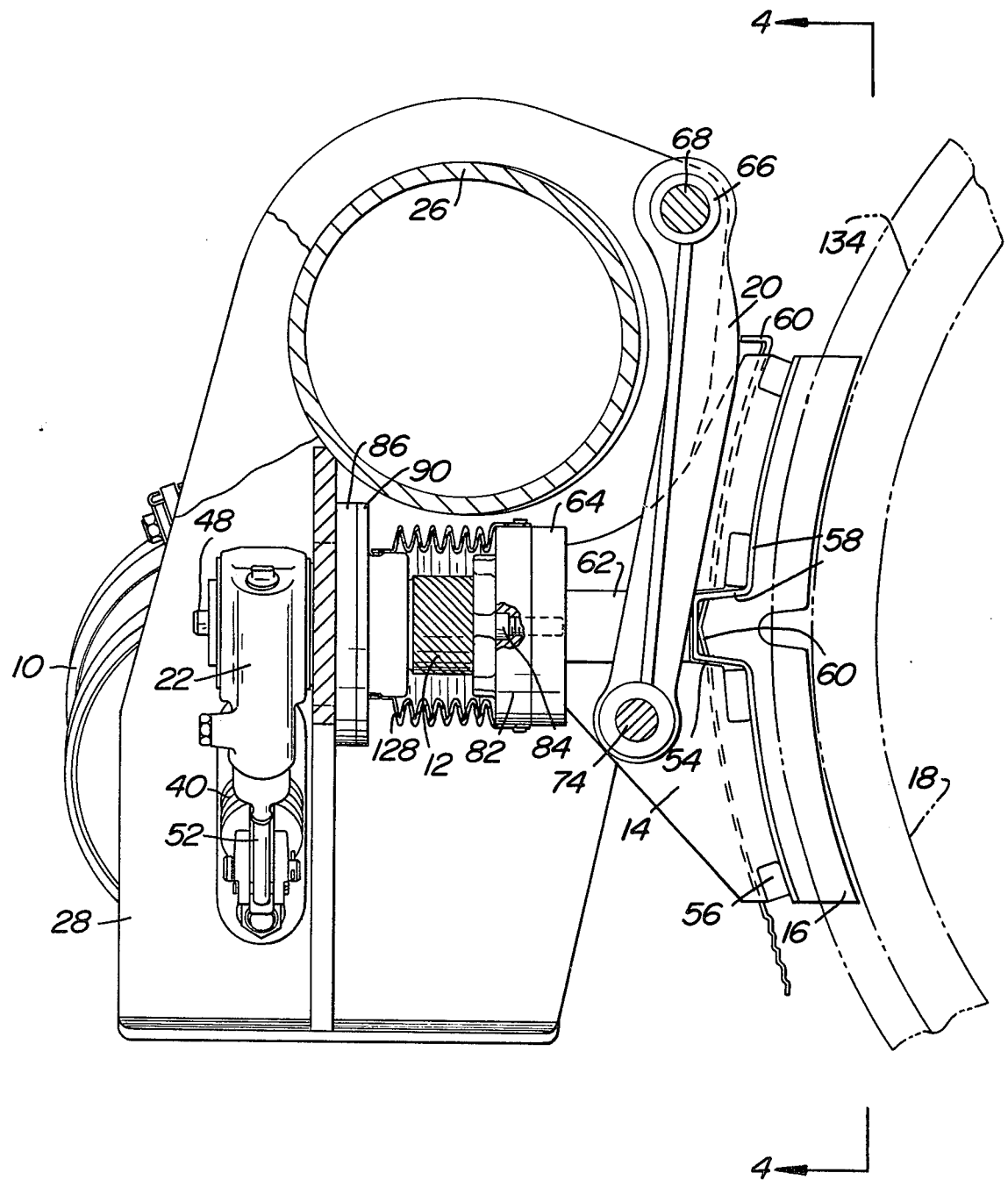
FIG. 1 is a side elevational view of the brake system.

The instant brake mechanism or system is especially designed for use on railroad cars and, as will appear hereinafter, is a simplified, compact, light-weight system partially utilizing standard mass produced highway components. While one rail car brake mechanism is shown and will be described herein, it is to be understood that there will be one brake unit for each railroad wheel, arranged to operate simultaneously on each car from a common compressed air source.

The basic components of the system are a conventional compact, light-weight service/spring brake cylinder 10 which operates a screw 12 that is connected to a railroad brake head 14 equipped with a brake shoe 16 to move the same into braking engagement with a railroad flanged wheel 18, the head being pivotally attached by a hanger 20 to a support. The screw is connected to a slack adjuster 22 which is operatively connected to the push rod 24 of the brake cylinder to automatically adjust for wear on the shoe and wheel while converting the linear motion of the push rod to rotary motion of the power screw 12.

The brake unit is mounted to a fixed frame member 26 of the rail car truck by appropriate means. Vertically extending spaced plates 28 and 30 are welded to the support 26, which can be a transverse tubular member, the plates being joined by a web or gusset 32.

The brake cylinder 10 is mounted by integral studs 34 using suitable lock nuts and washers on plate 28. The brake cylinder is a conventional commercially available unit, a non-limitative example of which is Anchorlock-Combination Service/Spring Brake Model 3636 COMB, Division of Royal Industries, Compton, Cal. The brake cylinder includes a spring brake chamber SP having a spring 35 therein and a service brake chamber SE which contains a diaphragm D1 which exerts pressure on the push rod 24. Normally, when the train is running, compressed air from the reservoir (not shown) is admitted to the spring brake chamber but not to the service chamber. The air in the spring brake chamber SP keeps spring 35 compressed by acting on diaphragm D2 therein. To apply the brakes, a valve is operated which causes compressed air from the reservoir to enter the service chamber which pushes the push rod 24 outwardly and applies the brake. Should the service brake fail, the valve automatically vents the spring brake chamber allowing the normally compressed spring 35 to expand and cause the push rod 24 to move outwardly and apply the brake mechanically. A return spring 36 in the service chamber acts to withdraw the push rod and release the brakes when the valve is operated to cause air to vent to the atmosphere from the service chamber.

The push rod 24 is connected to one end of the clevis 38 of a commercially available automatic slack adjuster 22, a dust boot 40 being retained between the support plate 37 and nut 39 which surrounds the push rod 24 and protects it from exposure to foreign matter. Automatic slack adjusters to automatically adjust for brake shoe wear are well known in the art as evidenced by U.S. Pat. No. 3,949,840 and the patents cited therein. One non-limitative example of an automatic slack adjuster utilizable in the present brake assembly is the Rockwell Standard Automatic Slack Adjuster made by Rockwell Internation, Troy, Michigan which is shown and described in said U.S. Pat. No. 3,949,840. In such a slack adjuster the clevis 38 is pivoted intermediate its ends as at 41 to the arm 42 of the slack adjuster body whose other end is splined as at 44 to one end portion 46 of the screw 12 and there held in place by an appropriate self-locking cap screw 48. The other end of the clevis 38 is pivoted as at 50 to a rod 52 which slides in and out and is attached at its inner end to an actuator having angled serrations which engage a spring-held pawl (not shown). As air is applied in the service chamber of the brake cylinder to move its push rod 24 and thereby apply the brakes, the arm 42 rotates about the screw 12 center line and the clevis moves out in a straight line. When the movement exceeds the desired stroke of the push rod 24, approximately 2½ in., as a result of brake lining wear, the rod 52 pulls the actuator up causing it to skip a tooth on the pawl. As air is released from the brake cylinder, the rod 52 moves back forcing the actuator down and, because the pawl is now engaged, the actuator cannot slide down the spline, so it rotates, thereby causing the worm (not shown) which is connected to the actuator to rotate to advance the gear and brake screw 12 a small amount to automatically adjust the brake.

The brake head 14 comprises a pair of spaced plates 51 and 53 with a central indentation at 54 and crescent shaped forward edges joined by a web plate immediately behind the indentation and four cross bars 56. The brake shoe 16 is similarly curved and includes friction material on its face and a backing plate 58 which extends into the indented portion 54, the brake shoe being removably retained on the head by a key 60 which extends between the brake head plates 51 and 53 and through a suitable hole in the backing plate 58 of the shoe. Welded centrally between the plate 51 and 53 is a tube 62 to which is welded a mounting plate 64 for a purpose soon to appear.

The vertically extending hanger 20 is in the form of a fork including transversely spaced partially curved bars welded at their upper ends to a tubular bearing 66 through which extends an upper headed pin 68 that also extends through plates 28 and 30 on the cross tube support member 26 and there retained by a pin retainer 70. The upper ends of the hanger are rotatable about the pin 68. The lower end portions of the hanger include transversely aligned holes 72 through which extends a lower headed pin 74 which also extends through aligned holes in the brake head plates 51 and 53 and is retained by a suitable cotter pin 76, the lower ends of the hanger being rotatable about the lower pin 74. Thus, the brake head is pivotally mounted on the fixed cross tube 26.

Coming now to the screw 12 and bearing construction shown more particularly in FIGS. 5 and 6, the body thereof includes a threaded portion 78 and a reduced portion. The end section 46 of the reduced portion includes the splines 44 to which the slack adjuster is secured whereas the intermediate section 80 immediately adjacent the threaded portion is smooth. The threaded portion 78 is engaged in an internally threaded nut 82 which is secured to the mounting plate 64 carried by the brake head by means circumferentially spaced bolts 84, the threaded portion 78 being adapted to move into the tubular portion 62 of the brake head.

The thread of the screw 12, which may be induction hardened steel, preferably has an outside diameter of about 2.2 in., a tooth depth of about 0.125 in., a lead of about 5.8 in., a lead angle of about 45°, a thread flank angle of about 30° and about 12 starts; and the internal thread of the nut, which is made of ductile cast iron, or other suitable materials, has thread dimensions to fit the screw. The lead angle of 45° provides high efficiency in converting rotation of the screw to linear movement thereof.

A novel bearing member engages the intermediate smooth portion 80 of the screw and is secured to the fixed cross tube 26. A bearing housing 86 is secured to the cross tube 26 using self-locking, socket head cap screws 88. Similar screws 89 secure a substantially cylindrical bearing retainer 90 to bearing housing 86. The screw is retained in the housing by the bearing 81 and by the bolt 48, which through washer 49 and slack adjuster 42 bearing on anti-friction teflon and rubber washers 94 and 96 interposed between a face of the slack adjuster and the housing 86, prevent axial movement of the screw.

Within the cavity 98 formed in the mating of the housing 86 and bearing 81 retainer 90 is a spherical bearing. Actually, it is a spherical bearing cut in half, the half 100 closest the threaded portion 78 being pressed on the screw shaft for rotation therewith, the outer surface 102 thereof being substantially semispherical and retained by a ring providing an outer race 104 whose inner surface corresponds with the outer surface 102. The other half 106 of the bearing which is furthest from the threaded portion 78 is shaped similarly to the semi-spherical bearing 100 and is retained by a ring providing an outer similar race 108, but this semi-spherical bearing 106 floats freely on the screw shaft. A seal 109 of rubber is retained in the housing 86.

As indicated above, the spherical bearing is split centrally into two halves 100 and 106 forming a space therebetween, the semi-spherical bearing 100 having a planar face 110 which opposes the planar face 112 of the other semi-spherical bearing 106.

In the space between the faces 110 and 112, an anti-friction needle thrust bearing 114 is provided in the form of a disc 116 having a plurality of radial slots 118 which retain elongated cylindrical members 120 which rotate in the disc and extend from both faces thereof and are adapted to bear on the opposed faces 110 and 112 of the semi-spherical bearings making, in effect, needle contact therewith, the needle bearing being rotatably mounted via its central opening 122 on the screw shaft. In practice, a thrust washer 124 is interposed between the needle bearing and one face 110 or 112 of the semi-spherical bearings and a spacer 126 may be placed in the space between the planar faces 110 and 112 to properly position the needle bearing 114.

Figure 2:
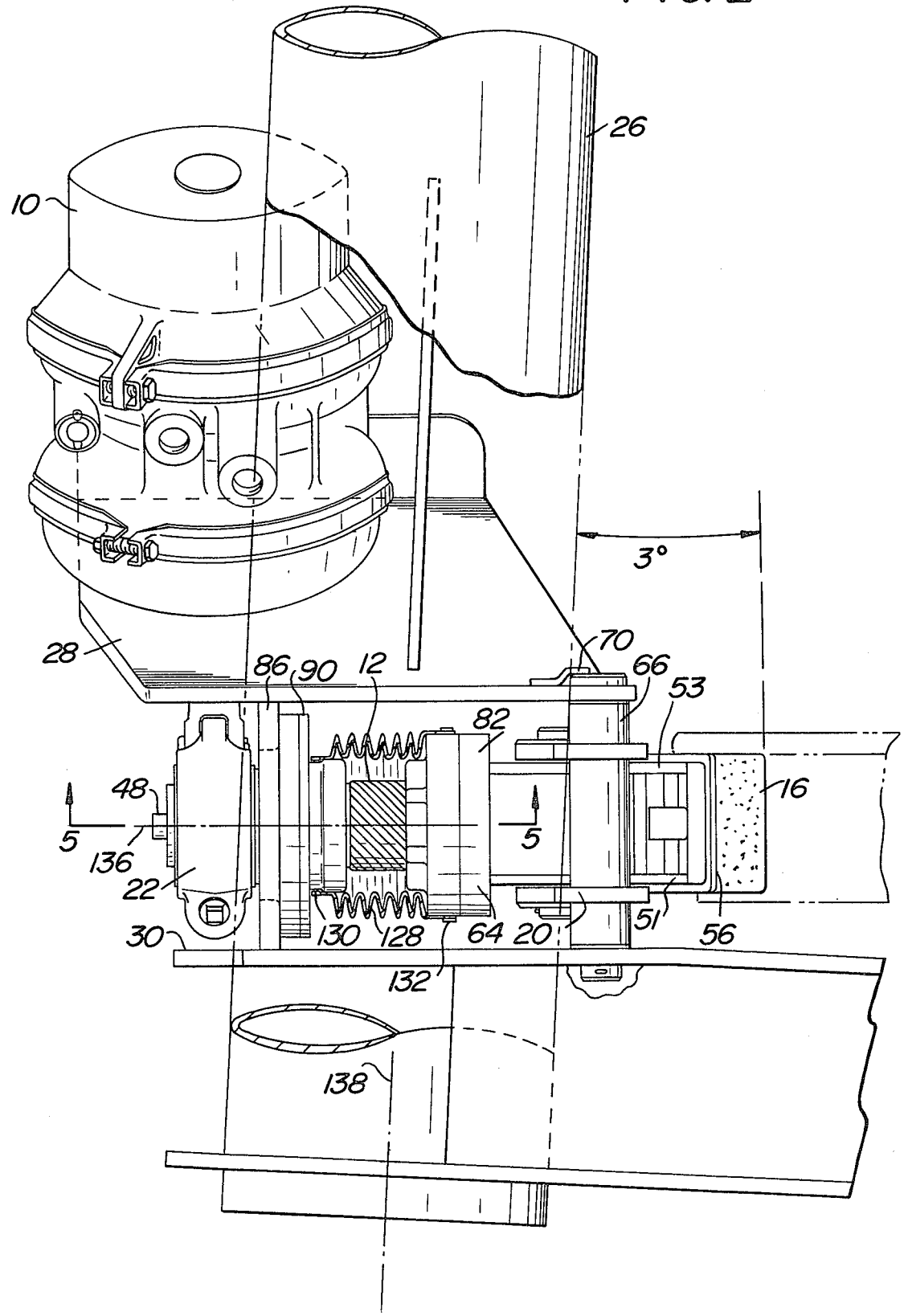
FIG. 2 is a top plan view thereof.
Figure 3:
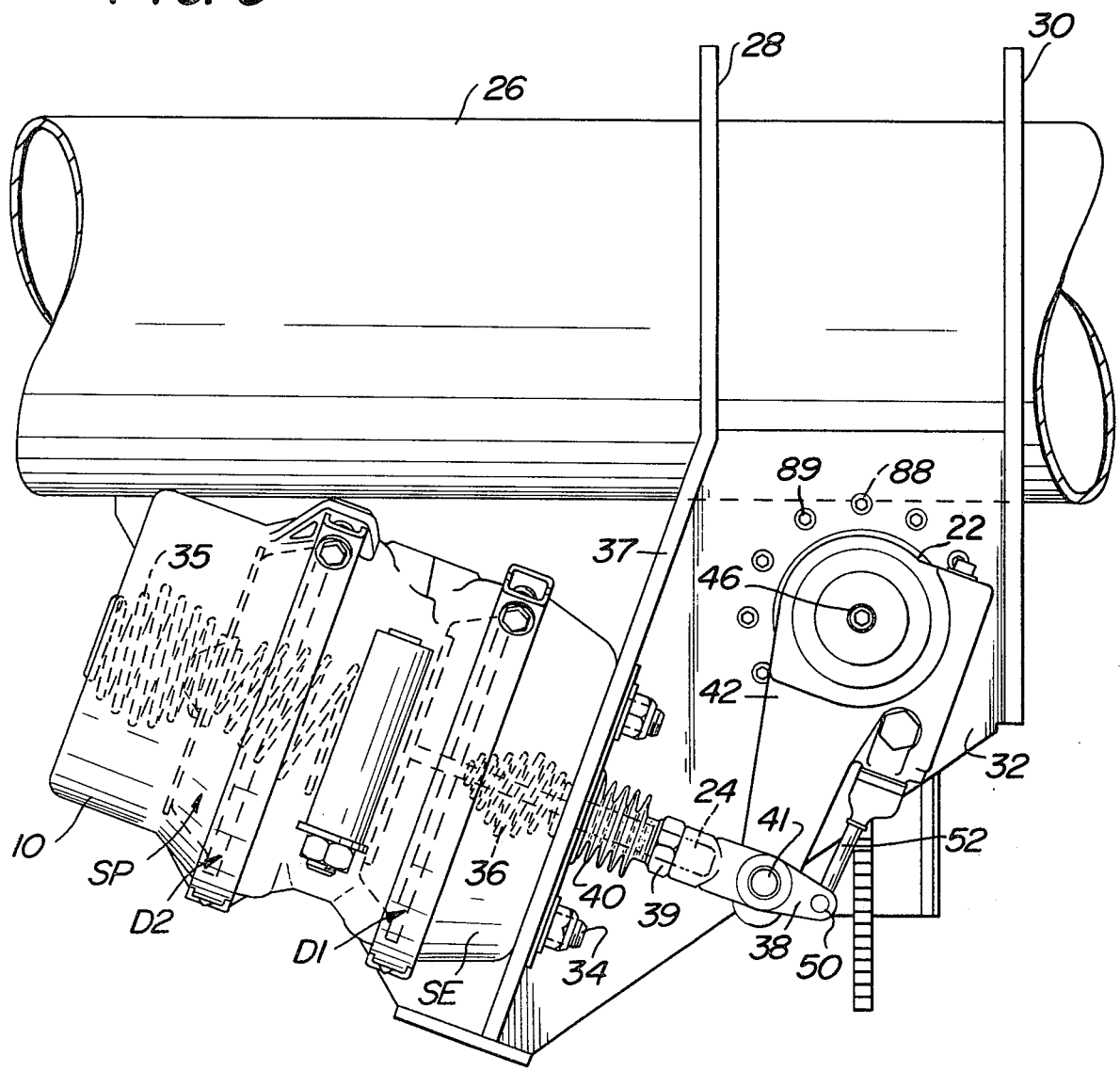
FIG. 3 is a front elevational view of the brake system shown in FIG. 1.
Figure 4:
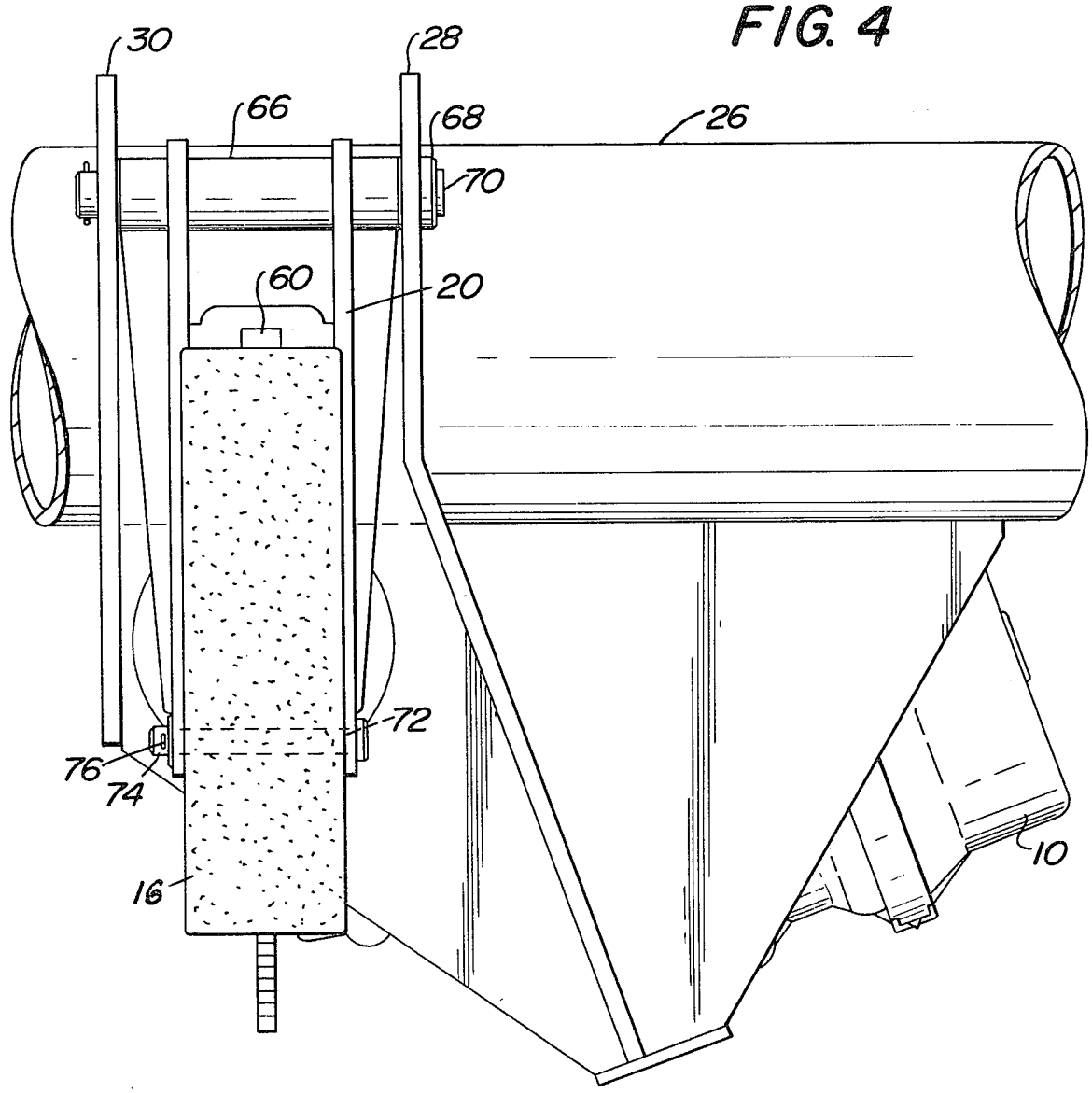
FIG. 4 is a sectional view taken on line 4—4 of FIG. 1.

To protect the threaded portion 78 of the screw against foreign particles a dust boot 128 surrounds the portion 78, see FIGS. 1 and 2, and is suitably clamped as at 130 and 132 to the bearing retainer 90 and nut 82 respectively.

Conventionally, the tread 134 of a flanged railroad wheel is formed with a tread taper normally 1 in 20 or about 3°. So that the brake shoe 16 will move truly perpendicular to the tread when the brakes are applied, the brake is so mounted that the center line 136 of the screw 12 and brake assembly is not perpendicular to the center line 138 of the cross tube 26 (which is parallel to the axle) but, rather, at an angle approximately of 3° thereto.

In use, the brakes are applied by admitting compressed air, by a manual or foot-operated valve through the air circuit, from a reservoir to the service chamber SE of the brake cylinder 10. This causes the push rod 24 to extend outwardly and, acting on the clevis 38 of the slack adjuster 22, rotates the latter and the screw 12 which is splined thereto. This rotates the screw in the nut 82 which is fixed to the brake head 14 causing the latter to advance toward the wheel 18 and force the brake shoe 16 into contact with the wheel tread 134. Generally, 9-10,000# of braking force is required when using composition brake shoes. The thrust reaction to this force is transmitted through the screw 12 to the semi-spherical bearing 100, which is fixed to the screw, then to the free-floating roller thrust bearing 114, then to the free-floating semi-spherical bearing 106, then to the race 108, then to the bearing housing 86 and, finally, to the fixed cross tube 26 of the rail car truck, a virtually direct load straight line path. As the brake is applied, the load on the bearings 100 and 106 is large and, because of their large spherical surface areas, a great deal of thrust reaction friction would be generated, thereby decreasing the mechanical efficiency of the system. By using the free-floating needle bearing 114 between the free-floating semi-spherical bearing 106, the friction caused by the thrust load is overcome so that practically none of the rotative effort of the brake cylinder force is wasted in overcoming this thrust reaction friction. By mounting the screw and brake head assembly on the spherical bearings and pivotally on the hanger pins 68 and 74, there is virtually no frictional resistance to the linear motion of the brake head 14. In reality, the only frictional force to overcome is that between the screw 12 and the nut 82 which is minimized by the screw and nut design.

Since the pin 74 and therefore the brake head 14 moves in an arcuate path of radius 68-74, the axis of screw 12 has a slight angular movement. The spherical bearing comprising parts 100, 104, 106, 108 permits this movement to occur without binding. The spherical bearing also carries the reaction at the outer end of the screw 12 caused by the tangential braking force at the shoe to wheel interface primarily resisted by the hanger 20 through pin 74.

Additionally, the mounting of the brake assembly at an angle of 3° from the axis of the wheel assures that the brake shoe face is truly parallel to the wheel tread and moves perpendicular thereto, thereby minimizing wear on the brake shoe and wheel.

The parts most subject to wear, namely, the screw 12, nut 82, spherical and roller bearings 100, 106 and 114 are protected by the boot 128 and seal 109, and the push rod 24 where it emerges from the brake cylinder 10 is protected by the boot 40.

Additionally, should the service brakes fail because of air loss from the reservoir, valving exhausts the spring brake chamber SP allowing the spring 35 to urge the push rod 24 outwardly of the chamber and apply the brakes mechanically and automatically. By manually exhausting air from the spring brake chamber SP, application of parking brakes is accomplished.

What is claimed is:

1. In a rail car truck having a support member and rail wheels, a brake mechanism for each wheel comprising a brake head and shoe carried thereby, hanger means pivotally suspending said brake head from said support member, a long-lead screw, a nut carried by said brake head and receiving one end of said screw, a housing mounted on said support member, anti-friction bearing means in said housing and rotatably supporting the other end of said screw, a pneumatic cylinder and push rod operative thereby and means connecting said push rod with the outer end of said screw whereby admission of compressed air into said cylinder will rotate said screw and advance said brake head and shoe essentially linearly towards and into braking engagement with a wheel, said bearing and hanger means acting to minimize frictional resistance to the linear motion of said brake head while maintaining said brake head positively in proper angular relationship with said wheel, said bearing means including a diametrically split spherical bearing providing opposed spaced planar faces, one of which split bearing portions is mounted for rotation with said screw and the other of which floats thereon, a pair of rings in said housing providing an outer race for each of said split bearing portions respectively, and an anti-friction, free-floating roller bearing positioned on said screw between said faces and bearing thereon to combine with said floating split bearing portion and absorb reactive thrust when the brake is applied while said spherical bearing carries the radial loads.

2. The combination of claim 1 wherein said roller bearing includes a slotted disc and a large number of small diameter elongated cylindrical members rotatively carried by said disc and spaced circumferentially thereof, extending through both faces of said disc and making substantial line contact with said opposed faces of said split spherical bearing.

3. The combination of claim 1 wherein said screw includes external threads having a lead angle of 45°, and said nut receiving said screw includes a corresponding lead angle to maximize efficiency in converting the rotation of the screw to linear motion to advance the brake head.

4. The combination of claim 1 wherein said pneumatic cylinder includes two chambers, one a spring brake chamber with a heavy spring therein and normally containing compressed air to keep said spring compressed, and the other, a service chamber with a return spring therein connected to said push rod and normally without compressed air therein, whereby when compressed air is admitted to the service chamber to apply the brakes, the push rod moves outwardly of the service chamber and rotates the screw to advance the brake head essentially linearly, and when the compressed air is vented therefrom to release the brake, the return spring pulls said push rod back, and when said service brake fails or when it is desired to park the car, air is depleted from said spring brake chamber of said cylinder, said compressed spring takes over and acts on said push rod to urge it out and thereby causes the brakes to be applied mechanically and automatically.

5. The combination of claim 1 wherein the rail wheel includes a tread having a taper of predetermined angle and the center line of said screw is perpendicular to said tread so that the face of the brake shoe is parallel to the wheel tread and moves perpendicular thereto.

6. The combination of claim 1 wherein said means interconnecting said push rod and said screw is an automatic slack adjuster.

* * * * *